(12) United States Patent
Balsa González et al.

(10) Patent No.: US 8,444,091 B2
(45) Date of Patent: May 21, 2013

(54) AIRCRAFT STABILIZER SURFACE TRAILING EDGE

(75) Inventors: Alberto Balsa González, Madrid (ES); Francisco de Paula Burgos Gallego, Madrid (ES)

(73) Assignee: Airbus Operations S.L., Madrid (ES)

( * ) Notice: Subject to any disclaimer, the term of this patent is extended or adjusted under 35 U.S.C. 154(b) by 849 days.

(21) Appl. No.: 12/388,696

(22) Filed: Feb. 19, 2009

(65) Prior Publication Data
US 2010/0155528 A1  Jun. 24, 2010

(30) Foreign Application Priority Data
Dec. 18, 2008  (EP) .................................... 200803603

(51) Int. Cl.
*B64C 9/00*  (2006.01)

(52) U.S. Cl.
USPC ........................................ 244/123.1; 244/87

(58) Field of Classification Search
USPC ................................ 244/123.1, 87
See application file for complete search history.

(56) References Cited

U.S. PATENT DOCUMENTS

| 2,193,951 | A  | * | 3/1940 | Uum ................................ 24/293 |
| 6,779,757 | B2 | * | 8/2004 | Thomas, Jr. ............... 244/123.1 |
| 2004/0000613 | A1 |  | 1/2004 | Thomas, Jr. |

FOREIGN PATENT DOCUMENTS

| DE | 1214092 |   | 4/1966 |
| DE | 1214092 | * | 7/1966 |

* cited by examiner

*Primary Examiner* — Tien Dinh
*Assistant Examiner* — Michael Kreiner
(74) *Attorney, Agent, or Firm* — Ladas & Parry LLP

(57) ABSTRACT

Trailing edge (3) of an aircraft stabilizer surface (1), where this surface (1) is manufactured of a composite material and comprises an outer cladding (40) and an inner cladding (41) that are connected by a connecting clip type element (20) on this trailing edge (3), the connecting clip type element (20) comprising at its ends some recesses (23) used for coupling to the inner zone of the upper and lower claddings (40, 41) of the stabilizer surface (1), such that the connecting clip type element (20) is flexible enough to be pinched so that its ends will be housed, by means of these recesses (23), between the outer and inner claddings (40, 41) of the aircraft stabilizer surface (1), whereby the outer zone of the stabilizer surface (1), on its trailing edge (3), is formed by a continuous aerodynamic surface without changes of gradient.

8 Claims, 4 Drawing Sheets

AIRCRAFT STABILIZER SURFACE TRAILING EDGE

FIELD OF THE INVENTION

This invention refers to a design of the trailing edge of an aircraft stabilizer surface, and in particular to the design of the trailing edge of the elevator of an aircraft's horizontal stabilizer.

BACKGROUND OF THE INVENTION

The design of aeronautical structures requires an assurance that the created designs fulfil the guidelines established by aerodynamics without compromising the functionality of the parts and the aesthetics of the exterior elements. All these premises must be met at the same time, and in turn it is advisable to optimize the times and costs of manufacturing the aeronautical structures.

The trailing edge zone of the elevator of an aircraft's horizontal stabilizers manufactured of a composite material, and in particular carbon fibre, currently presents a drop-off or change of gradient zone in the connection of the claddings made of carbon fibre to the connecting clip type elements, typically made of a metal material, so that the elevator is protected against lightning impacts.

Thus, the drop-off or change of gradient presented in particular by the claddings of the elevators of the horizontal stabilizer surfaces may, on occasions and due to the difficulty of the geometry, develop wrinkles in the carbon fibre and air pockets, which leads to a subsequent delamination of these zones. These delaminations require laborious processes of repair that, in the most favourable case, involve a minimum of 5 hours of work, as the application of new cycles of autoclave curing of the surface in question is required. On the other hand, the machine time that is required to tape off this zone, and which requires close monitoring and constant control during the process, must also be taken into account.

This drop-off or change of gradient in the connection thus poses a fundamental problem, which is the lack of aerodynamic continuity of the surface. Attempts have been made to solve this problem in different known ways.

One of these solutions consists of using an aerodynamic fill material in the connection zone of the claddings to the connecting clip type elements, so that this fill will make these connecting clip type elements of the claddings flush with the claddings themselves, thus achieving an improved outer appearance or quality of the surface and improving its continuity, and at the same time achieving a better aerodynamic performance of this surface. The problem with this aerodynamic fill material is that it is subject to cracking during its in-service life on the aircraft, which also causes the corresponding cracking and subsequent flaking of the external surface paint, with the resulting complaints of the customers receiving the aircraft because the surface has a highly deteriorated appearance.

Another known solution is to fill the zone to be treated, i.e. the edges of the connecting clip elements where they connect to the claddings, by means of a sealant material strip. This solution does not maintain the continuity between the connecting clips and the claddings, and thus the visual appearance of the outer surface is not as good. Moreover, there is an aerodynamic penalty to this solution, which translates into increased parasitic resistance of the aircraft.

Therefore, there is a need to solve the problem of the above mentioned surfaces, in terms of their quality and also in terms of their assembly and the actual process of manufacturing them.

This invention is proposed to solve the problems described above.

SUMMARY OF THE INVENTION

Therefore, this invention refers to the design of the trailing edge of an aircraft stabilizer surface, and in particular to the design of the trailing edge of the elevator of an aircraft's horizontal stabilizer. The same design of the invention can also be used for the trailing edges of other aircraft surfaces, e.g., for the vertical rudder of the aircraft's vertical stabilizer, or the trailing edge of the aircraft wings.

The trailing edge design as per the invention for aircraft stabilizer surfaces made of composite materials, and typically of carbon fibre, is such that the connection to the upper and lower claddings of this stabilizer surface is made with a connecting clip type element, without having to use aerodynamic fill material or a sealant material strip in the connection. This avoids the existence of a drop-off or change of gradient between the surfaces, with the above mentioned problems that these connections entail.

The connecting clip type element of the invention includes at its ends some recesses prepared for connection through the inner zone to the upper cladding and the lower cladding of the stabilizer surface, respectively. This connecting clip type element must be flexible enough to be pinched, such that the ends of this clip will be housed, by means of the recesses provided for this purpose, between the cladding of the aircraft airfoil.

Thus, the stabilizer surface according to the invention is more easily manufactured, considerably facilitating and optimizing the fabrication of its claddings. In addition, it eliminates the surface drop-off or change of gradient, thereby eliminating potential future defects.

Other characteristics and advantages of this invention are provided in the following detailed description of an illustrative embodiment of its object in relation to the accompanying figures.

DETAILED DESCRIPTION OF THE INVENTION

This invention therefore refers to the design of the trailing edge of an aircraft stabilizer surface, and in particular to the design of the trailing edge 3 of the elevator 2 of an aircraft's horizontal stabilizer 1.

Figure 1:
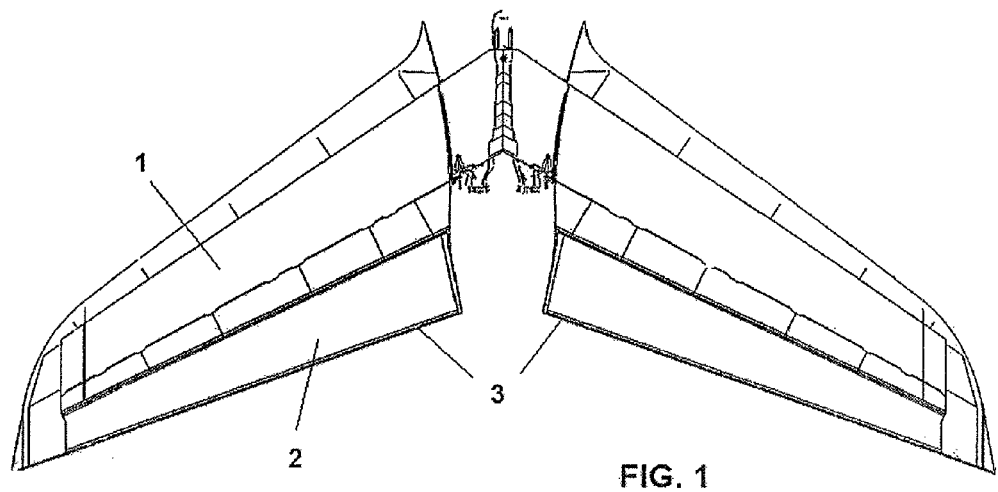
FIG. 1 shows a diagram of a horizontal stabilizer that comprises an elevator in a conventional aircraft.
Figure 2:
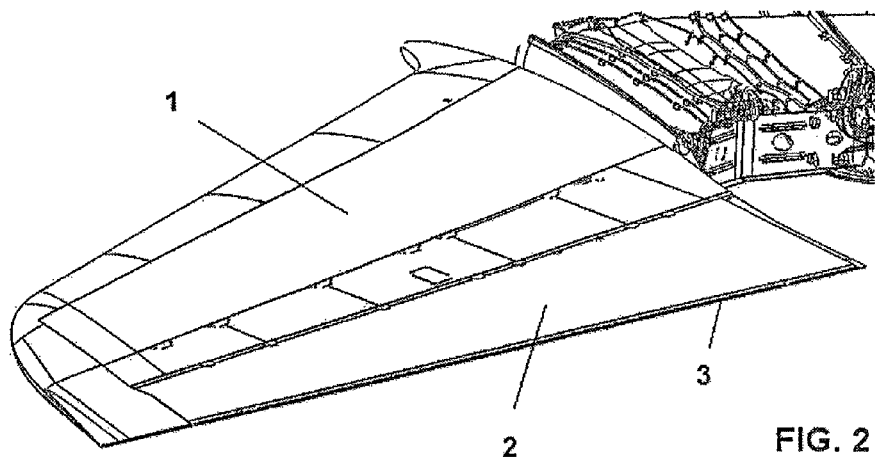
FIG. 2 shows an elevator of a horizontal stabilizer in a conventional aircraft.
Figure 3:
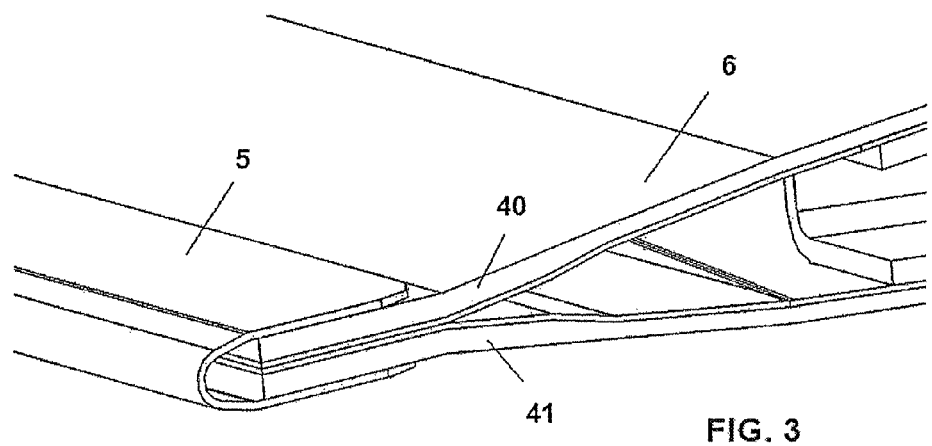
FIG. 3 shows a detail of the design of the trailing edge of the elevator of a horizontal stabilizer, according to the known state of the art.
Figure 4:
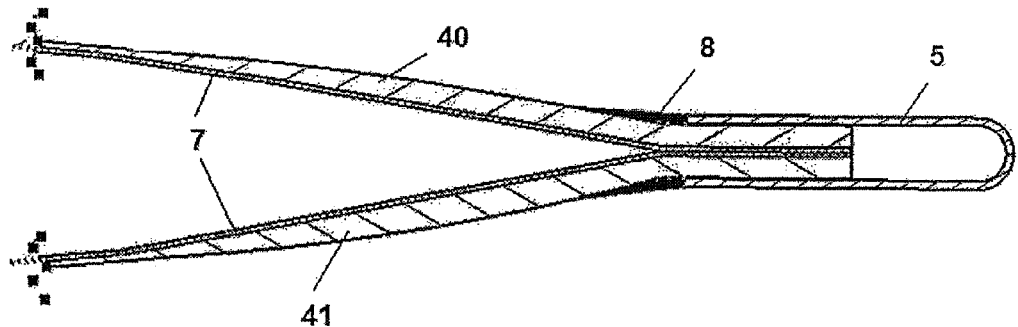
FIG. 4 shows a cross-section detail of the design of the trailing edge of the elevator of a horizontal stabilizer in which an aerodynamic fill material has been used, according to the known state of the art.

According to the previous known state of the art (FIG. 4), one of the solutions used in the connection of a clip type element 5 to join the upper and lower claddings, 40 and 41, of an elevator 2 in a horizontal stabilizer 1, is to use an aerodynamic fill material 8, such that this fill 8 makes these cladding connecting clip type elements 5 flush with the claddings 40 and 41 themselves, thus achieving an improved outer appearance or quality of the surface and improving its continuity, and at the same time achieving a better aerodynamic performance of this surface.

Figure 5:
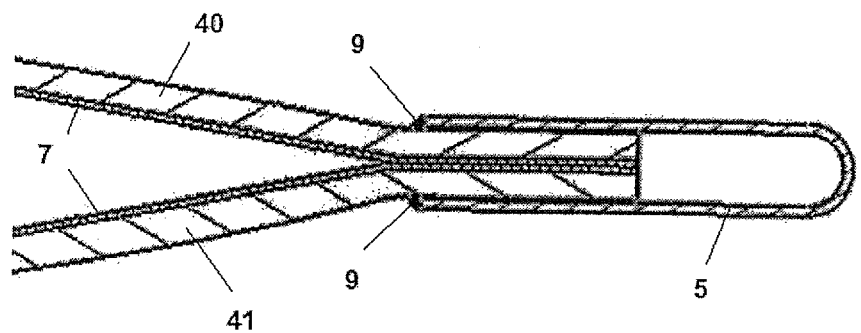
FIG. 5 shows a cross-section detail of the design of the trailing edge of the elevator of a horizontal stabilizer in which a sealant material strip has been used, according to the known state of the art.
Figure 6A:
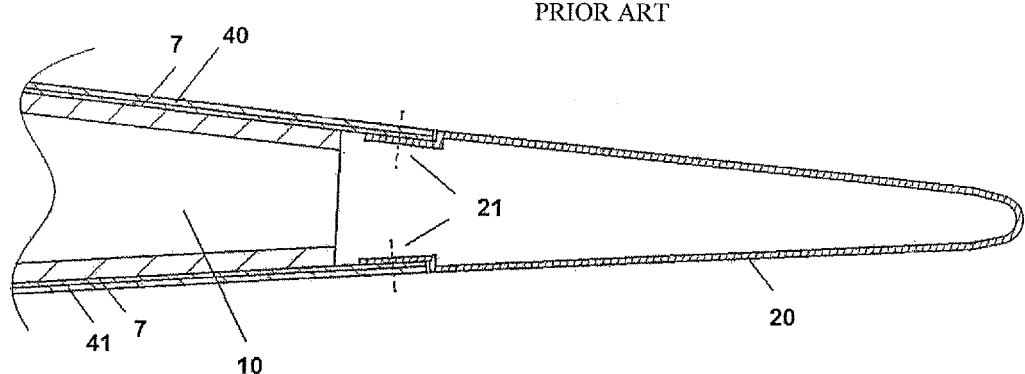
FIGS. 6a and 6b show a cross-section of the design of the trailing edge of the elevator of a horizontal stabilizer, according to this invention.
Figure 6B:
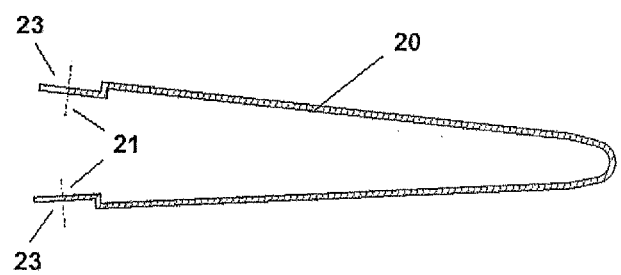
Figure 7:
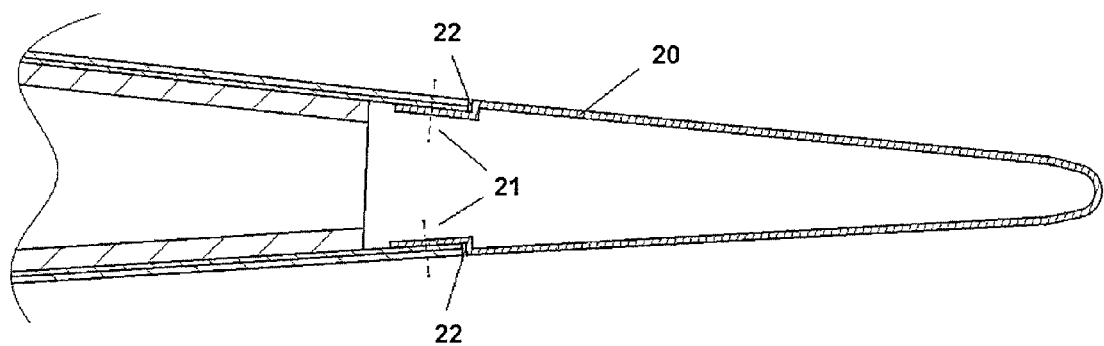
FIG. 7 shows a cross-section of a detail of the connection of the clip type elements to the stabilizer claddings, in the design of the trailing edge of the elevator of a horizontal stabilizer, according to this invention.

Another known solution (FIG. 5) is to fill the zone to be treated, i.e. the edges of the connecting clip elements 5 where they connect to the claddings 40, 41, by means of a sealant type material strip 9.

According to the invention, new connecting clips 20 are designed that avoid the use of the fill material 8 and the use of the sealant material strip 9 to achieve a good aerodynamic surface. In addition, as per the invention, the trailing edge 3 of the elevator 2 of the stabilizer 1 does not comprise any drop-off 6 or change of gradient, thus achieving an outer connection that is continuous along the surface.

The design of the trailing edge 3, as per the invention, on aircraft stabilizer surfaces 1 made of composite materials, and typically of carbon fibre, is such that the connection to the upper and lower claddings, 40 and 41, respectively, of this stabilizer surface 1 is made with a connecting clip type element 20, without having to use aerodynamic fill material 8 or a sealant material strip 9 in the connection. This avoids the existence of the drop-off 6 or change of gradient on the outer surfaces of the claddings, 40 and 41, with the problems that these connections entail.

The connecting clip type element 20 of the invention comprises at its ends some recesses 23 prepared for connection through the inner zone 7 to the upper cladding 40 and the lower cladding 41 of the stabilizer surface 1, respectively. This connecting clip type element 20 must be flexible enough to be pinched, such that the ends of this clip 20 will be housed, by means of the recesses 23 provided for this purpose, between the claddings 40 and 41 of the aircraft airfoil 1.

With regard to the manufacturing process, the new proposed configuration according to the invention considerably facilitates and optimizes the fabrication of the claddings, 40 and 41, of the stabilizer 1. This lowers the cost of the manufacturing, as it eliminates the drop-off 6, and also eliminates potential future defects on their surface.

In addition, with the new design of the invention, the problems stemming from the application of the fill material 8 are prevented, as well as the flaking caused when the aircraft is in service. The new aesthetics achieved on the outer surface of the trailing edge 2 as per the invention is excellent, since the continuity of the surface is complete and its aerodynamic performance is much better (on eliminating the steps or drop-offs 6 responsible for an increase of the parasitic resistance); also to be considered is the fact that the enhanced aesthetics on the exterior of the trailing edge 2 surface means greater customer satisfaction.

The new design as per the invention does not present any problems in the assembly phase of the connecting clip type elements 20 on the trailing edge 3, given that this could be done in the same way as known assembly processes and in the same order of assembly of parts. It must also be taken into consideration that all the tools used with the current known solutions would also serve for the new design. To complete the assembly according to the design of the invention, sealant 22 would have to be applied to the outer zones of the connections of the recesses 23 to the claddings 40 and 41, in an identical way as done for the other component elements of the horizontal stabilizer 1. Therefore, for assembly of the new clips 20, it would only be necessary to take advantage of the flexibility of the part to be able to pinch it and insert it between the claddings 40 and 41.

The connecting clip type elements 20 as per the invention will be metal, and preferably aluminium, in order to protect the elevator 2 against lightning impacts, and they will preferably be connected by riveted joints to the claddings 40 and 41.

By way of comparison, the time spent on the assembly of the new designs of the connecting clip type elements 20 with respect to the known ones 5 could be shortened (considering the clip type elements 20 and 5, riveted to the claddings 40 and 41, in both designs) from one and a half working days ($\approx$12 h) to 1 h of work, with the resulting saving in manufacturing costs that this would entail.

Moreover, according to the design of the invention, the possible problems that could arise in the carbon fibre on taping the drop-off 6 would be avoided, as they would no longer exist, and this would also save on the machine time used for this taping. All this would entail a very significant saving in manufacturing and assembly time and costs of the invention design compared to the known designs.

There is also a very significant "non-quality" cost of the aforementioned, which is the cost owing to customer complaints when the outer paint flakes off due to application of the fill material 8.

On the other hand, the design of the invention does not compromise the electrical continuity and drainage of the stabilizer surface 1, and the same materials used in the known solutions are also maintained for both the claddings 40 and 41 and for the clip type elements 20.

Therefore, the main significant advantages of the new design of the invention over the known designs are as follows:
- it enhances both the quality and aesthetic appearance of the stabilizer surfaces 1;
- it enhances the aerodynamics of the stabilizer surfaces 1;
- it simplifies the manufacturing of the claddings 40 and 41 of the elevator 2 of the horizontal stabilizer surfaces 1;
- it improves the assembly process of the connecting clip type elements 20 on the horizontal stabilizer surfaces 1; and
- it reduces the unit costs of manufacturing.

Geometries similar to that of the trailing edge 3 of the elevator 2 of a horizontal stabilizer 1, as described in the preferential embodiment of the invention, can also be used for other elements of an aircraft, in which case the design of the invention can be applied to those components. This refers to the following parts of the aircraft: trailing edge of the vertical rudder of the vertical stabilizer of the aircraft, and trailing edge of the wings.

Those modifications included within the scope defined by the following claims can be introduced into the embodiments described above.

The invention claimed is:

1. Trailing edge of an aircraft stabilizer surface, where said surface is manufactured of a composite material and comprises an upper cladding and a lower cladding that are connected by a connecting clip on said trailing edge, wherein the connecting clip has a U-shaped profile with at least one recess at each end used for coupling to the inner surfaces of the upper and lower claddings of the stabilizer surface, such that the connecting clip is flexible enough to be pinched so that its ends have clearance with respect to the gap between the upper and lower claddings whereby the clip will be housed, by means of these recesses, between the upper and lower claddings of the aircraft stabilizer surface, whereby the outer zone of the stabilizer surface, on its trailing edge, forms a continuous aerodynamic surface without changes of gradient and wherein the connection of the clip to the upper and lower claddings, in their inner zone, is made with riveted joints.

2. Trailing edge of an aircraft stabilizer surface, as claimed in claim 1, wherein the connecting clip is made of a metal material.

3. Trailing edge of an aircraft stabilizer surface, as claimed in claim 2, wherein the connecting clip is aluminum.

4. Trailing edge of an aircraft stabilizer surface, as claimed in claim 1, which also comprises a sealant for the outer zones of the connections of the recesses of the connecting clip to the upper and lower claddings of said stabilizer surface.

5. Trailing edge of an aircraft stabilizer surface, as claimed in claim 1, wherein the trailing edge corresponds to the trailing edge of the elevator of an aircraft horizontal stabilizer.

6. Trailing edge of an aircraft stabilizer surface, as claimed in claim 1, wherein the trailing edge corresponds to the trailing edge of the vertical rudder of an aircraft vertical stabilizer.

7. Trailing edge of an aircraft stabilizer surface, as claimed in claim 1, wherein the trailing edge corresponds to the trailing edge of the wing of an aircraft.

8. Trailing edge of an aircraft stabilizer surface, as claimed in claim 1, wherein the stabilizer surface is made of carbon fibre.

\* \* \* \* \*

UNITED STATES PATENT AND TRADEMARK OFFICE
CERTIFICATE OF CORRECTION

PATENT NO. : 8,444,091 B2
APPLICATION NO. : 12/388696
DATED : May 21, 2013
INVENTOR(S) : Alberto Balsa Gonzalez et al.

It is certified that error appears in the above-identified patent and that said Letters Patent is hereby corrected as shown below:

Title page, item (30), Foreign Application Priority Data, "(EP)" should read --(ES)--.

Signed and Sealed this
Twenty-fourth Day of September, 2013

Teresa Stanek Rea
*Deputy Director of the United States Patent and Trademark Office*